United States Patent [15] 3,701,512
Schippers et al. [45] Oct. 31, 1972

[54] SCREW EXTRUDER FOR PROCESSING THERMOPLASTIC MATERIALS

[72] Inventors: Heinz Schippers; Friedhelm Hensen; Erich Lenk, all of Remscheid-11, Germany

[73] Assignee: Barmag Barmer Maschinenfabrik Aktiengesellschaft, Wuppertal, Germany

[22] Filed: April 7, 1971

[21] Appl. No.: 132,064

[30] Foreign Application Priority Data

April 13, 1970 Germany..........P 20 17 580.8

[52] U.S. Cl. ........................259/191, 259/9, 259/97
[51] Int. Cl. ................................................B29b 1/10
[58] Field of Search ......425/208, 376; 259/9, 10, 97, 259/191, DIG. 39, 192, 193; 416/176

[56] References Cited

UNITED STATES PATENTS 2,680,879    6/1954    Schnuck et al. ............259/191
2,838,794    6/1958    Munger et al. .............259/191
3,271,819    9/1966    Lacher .......................259/191
3,375,549    4/1968    Geyer ........................259/192

Primary Examiner—Walter A. Scheel
Assistant Examiner—Alan I. Cantor
Attorney—Johnston, Root, O'Keeffe, Keil, Thompson & Shurtleff

[57] ABSTRACT

A screw extruder for processing thermoplastic materials, e.g. high molecular weight polymers, in which the spiral worm passage formed by a conveying screw is subdivided into two compartments of different and oppositely varying cross-section by an intermediate shearing screw having a radial clearance from the extruder barrel housing of at least twice that of the conveying screw, the thread depth in each subdivision or compartment of the worm passage being continuously varied over the length of the screw between maximum and minimum values, thereby causing a predetermined flow of thermoplastic material across the flight land of the shearing screw.

12 Claims, 8 Drawing Figures

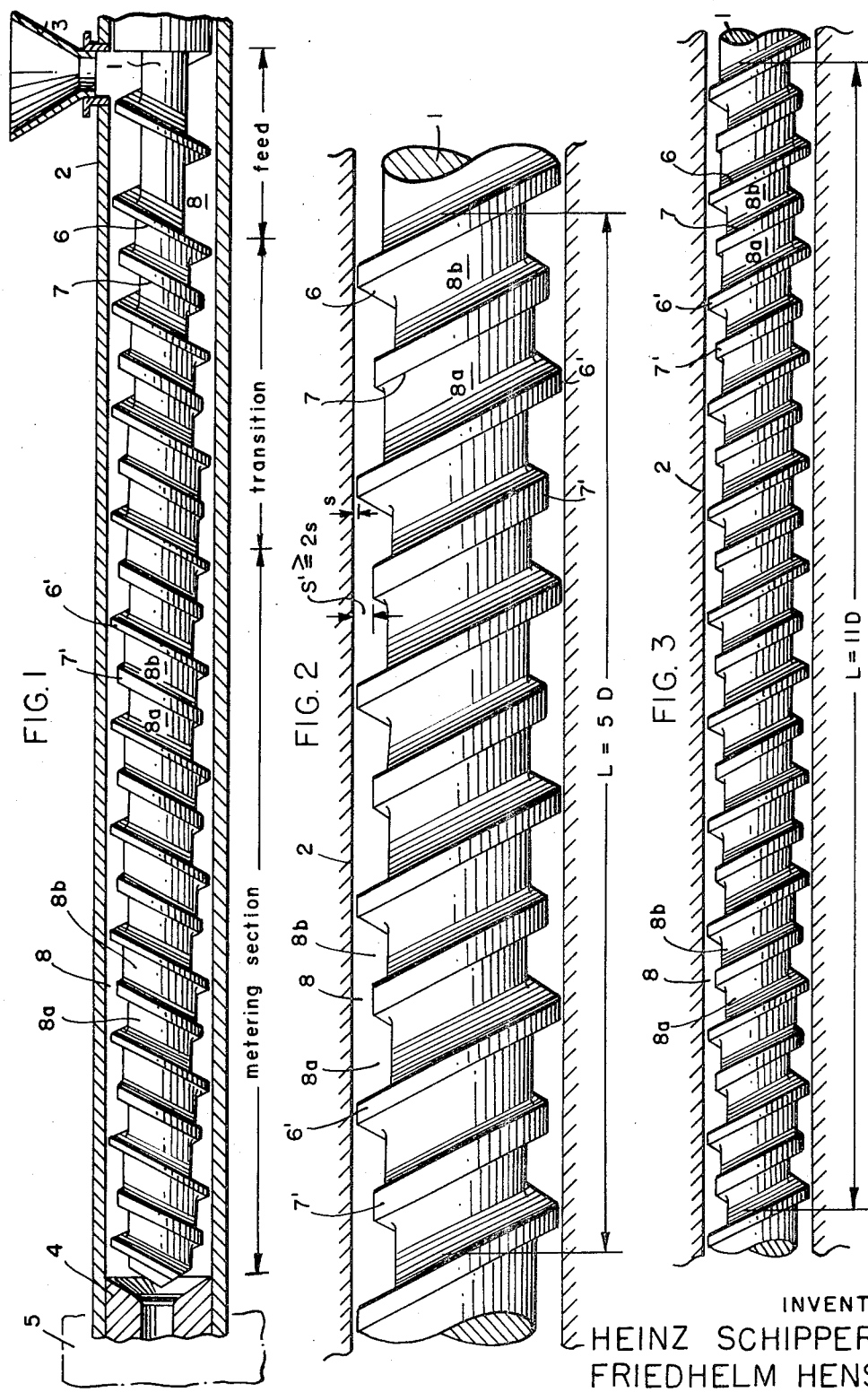

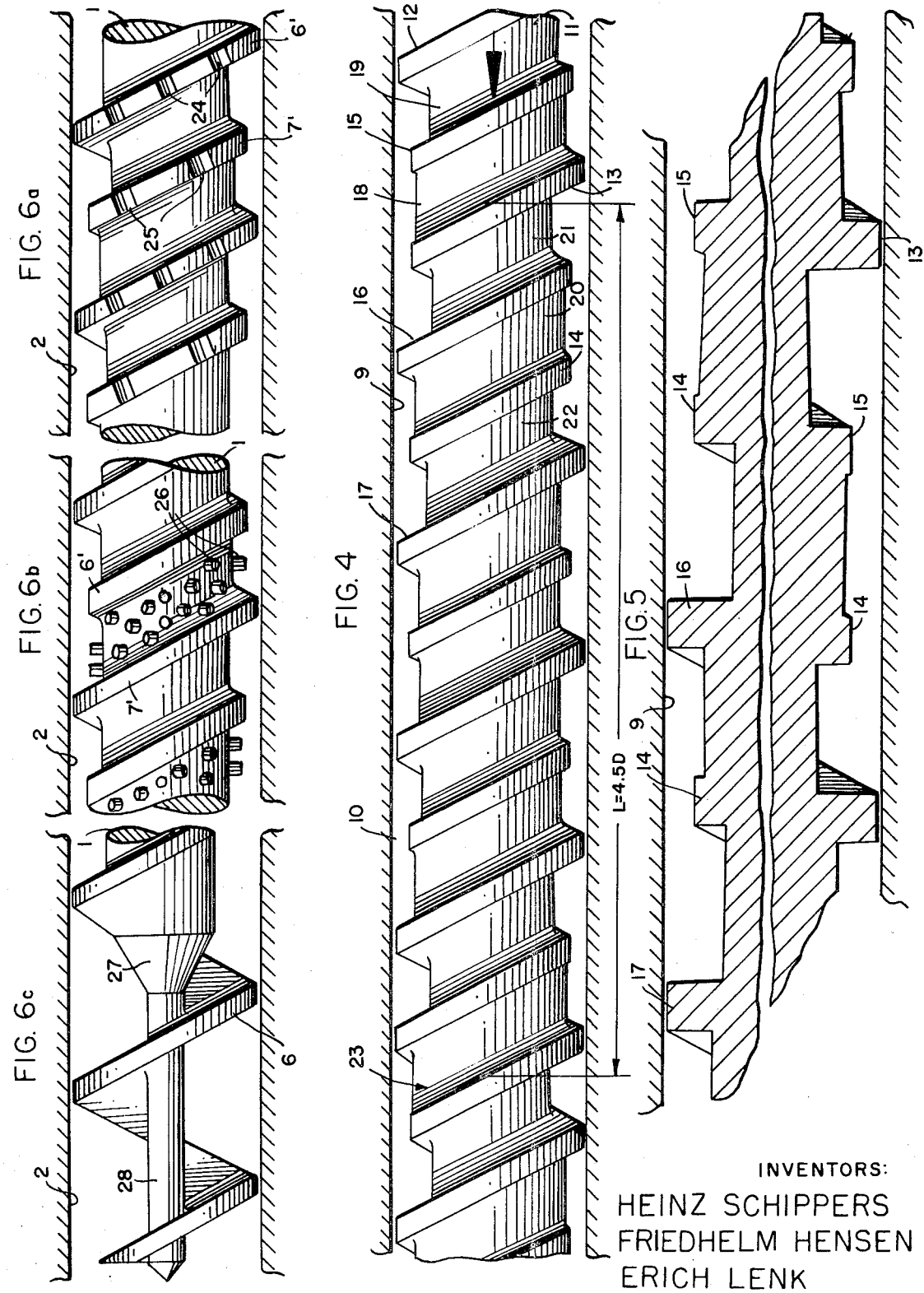

SCREW EXTRUDER FOR PROCESSING THERMOPLASTIC MATERIALS

Screw extruders are generally well known and are commonly employed in the processing of thermoplastic polymers, for example in mixing, homogenizing, extruding, granulating, spinning and similar operations. In all cases, it is usually desirable to continuously convey the thermoplastic material up to a discharge point such as an extrusion die or the like, the conveyance or transport of the thermoplastic material being accomplished by means of a screw rotated within the extrusion barrel. The thermoplastic material can be introduced as a finely divided or granulate solid through a hopper at the feed end of the extruder barrel. This thermoplastic material is then conducted by the screw through a first feed zone and then through a transition or compression zone and finally into a metering or homogenizing zone just prior to discharge or extrusion of the molten thermoplastic material. Thus, as the material is conveyed, it is first compressed and melted and then worked or mixed in order to obtain the greatest possible uniformity in the extruded product. This is particularly true where the thermoplastic material is a mixture of polymers or contains any of a large number of well known additives, a very high degree of mixing and homogenizing being required to achieve a satisfactory uniform product.

It is therefore essential that any screw extruder designed for use with a thermoplastic material be capable of continuously conveying a predetermined quantity of the thermoplastic material while at the same time breaking up or intermixing the initially supplied material as much as possible as it is simultaneously heated and then uniformly discharged. However, the existence of more or less plastic particles of the thermoplastic material within the worm passage of the conveying screw, especially in the transition and metering zones, often hampers the required heat exchange over the passage cross-section as well as preventing an optimum mixing and homogenization of the material. A number of means and processing measures have been suggested in the prior art to solve these problems, but there is still room for substantial improvement over known apparatus and processes.

For example, it has been suggested that one might employ a partly eccentric screw core shaft in order to achieve a more intensive mixing of the molten thermoplastic. In addition, it has been suggested that one might separate the viscous or liquid constituents of the melt from the solid constituents by means of a second screw passage which forms a collecting zone, the second screw passage arising from the first or primary passage as a branched line. In addition, torpedo-like elements or cylindrical screw elements having a narrow gap at the wall of the barrel housing have been proposed for achieving an improved mixing. It is desirable in all such improvements to achieve a melt which is discharged or extruded with uniform properties and high quality, while also achieving a favorable output or discharge rate per unit time, all at relatively low costs.

One object of the present invention is to provide an improved screw extruder wherein the thermoplastic material is not only properly conveyed to a discharge or extrusion point but is also very thoroughly mixed and homogenized in a highly efficient manner. Yet another object of the invention is to provide an increased shearing effect in at least one of the transition and metering zones of the extruder, such that during a continuous conveyance of the melt there is also achieved a higher quality of the melt and a more favorable mixing and temperature distribution. Other objects and advantages of the invention will become more apparent upon consideration of the following detailed disclosure.

It has now been found, in accordance with the present invention, that the above noted objects can be achieved by providing a specific modification in an otherwise conventionally operated screw extruder for continuously processing a thermoplastic material wherein screw means are provided to convey the thermoplastic material consecutively through a feed section, a transition section and a metering section along the screw which is being revolved within an elongated extruder barrel housing while melting and mixing the conveyed material. The improvement of the invention essentially comprises an elongated screw core shaft housed in at least one of the transition and metering sections of the extruder, the screw core shaft bearing a primary conveying screw in which the thread flight extends radially outwardly to provide a small clearance $s$ between its outer peripheral edge and the interior cylindrical wall of the barrel housing, thereby defining a continuous spiral worm passage, the screw core shaft further bearing a secondary shearing screw in which the thread flight extends continuously in a spiral path centrally of the worm passage defined by the conveying screw and radially outwardly to a peripheral flight land which is approximately parallel to and spaced inwardly at a distance of at least about $2s$ from the interior cylindrical wall of the barrel housing, the depth of thread on each side of the shearing screw being continuously and oppositely altered in the direction of the worm passage length.

It is especially desirable to provide flight lands on each of the conveying and shearing screws which are relatively wide and parallel with the cylindrical wall of the barrel housing. In all instances, it is especially desirable to provide a shearing screw with a flight land which is substantially larger than the flight land of the conveying screw. In both cases, slots or recesses can be made through the conveying and/or shearing threads at predetermined points along the flight lands, and other supplementary mixing and/or shearing elements may be included as explained more fully hereinafter.

By varying or altering the thread depth on either side of the shearing screw so that the thread depth alternately increases and decreases between minimum and maximum values over the length of the screw, a number of mixing effects can be achieved depending upon the exact construction and method of variation of thread depth. It should also be noted that this variation in thread depth corresponds essentially to a variation in the cross-section of each portion of the spiral worm passage on the opposing side of the shearing screw or thread flight. With a constant pitch of the conveying screw or thread flight and preferably a similar constant pitch of the intermediate shearing screw, the spiral conveying worm passage is essentially subdivided into two compartments which vary in cross-section as the thread depth is continuously increased in one compartment while it is also constantly decreased in the other compartment.

This increase and decrease of the thread depth or the corresponding sizes of the two coincident compartments of the worm passage can be repeated or alternated a number of times over the length of the screw in the transition and/or metering zones of the extruder. With highly viscous thermoplastic melts, there may be only one or even less than one repetition over the entire length of the screw, whereas with highly fluid molten thermoplastic materials, this variation is thread depth or cross-sectional size of the chambers can occur several times over the length of the extruder, for example as frequently as one alternation over a screw length of at least one-half of the diameter of the conveying screw.

In general, the doubly threaded extruder screw shaft of the invention requires the additional and intermediate shearing screw as a means of obtaining a more effective shearing function by continuously passing the thermoplastic material during its conveyance across the flight land of the shearing screw in either a forward or backward direction or alternately back and forth over the length of the extruder. A substantial improvement in mixing and homogenizing the thermoplastic melt as well as a better temperature distribution are achieved in this manner at relatively little extra cost.

The invention can be better understood in connection with a number of preferred embodiments as illustrated in the accompanying drawings wherein:

FIG. 1 is a partly schematic and sectional view along the axis of rotation of the entire screw extruder in order to generally show the various operating zones thereof;

FIG. 2 is a similar view, slightly enlarged, of that portion of the screw of the invention as contained in the metering section of the extruder;

FIG. 3 similarly illustrates a screw constructed as in FIGS. 1 and 2 but wherein the variation of thread depth occurs over a much longer length of the metering section;

FIG. 4 illustrates a still further modified embodiment of the screw according to the invention, wherein the conveying screw becomes the shearing screw while the shearing screw simultaneously becomes the conveying screw after a single alteration of thread depth over the length of the screw;

FIG. 5 is an enlarged cross-sectional view of the screw taken from FIG. 4 with certain portions deleted;

FIG. 6a illustrates the use of recesses or slots through the individual thread flights as one additional mixing or shearing means;

FIG. 6b illustrates the addition of radial pins as yet another means of mixing or shearing; and FIG. 6c illustrates the enlargement of the worm passage at the exit or discharge end of the screw to provide a retention or delaying zone for the molten thermoplastic material.

Referring first to FIG. 1, there is generally illustrated a mixing screw extruder according to the invention in which the screw core shaft 1 is rotatably driven by conventional means at the feed end of the extruder barrel housing 2, a suitable feed hopper 3 being connected to the barrel housing with an opening into the beginning of the feed section. As required in most mixing or extrusion screws, the extruder is divided into three different sections or zones, namely a first feed zone followed by a transition or compression zone and then a somewhat longer metering or homogenizing section. At the discharge end of the extruder 4, the extruder barrel 2 is normally connected to an extrusion die 5 as indicated in a broken line segment.

In FIG. 1, the rotatably mounted screw core shaft 1 carries or bears the primary conveying screw or thread flight 6 from the very beginning of the feed section up to the point of discharge 4 into the extrusion die 5. This primary conveying screw 6 has the same helix angle and the same diameter over the entire length of the screw, i.e., its diameter extends very close to the cylindrical interior wall of the barrel 2 and has a constant pitch or lead over the entire thread flight. A secondary conveying screw referred to herein as the shearing screw 7 begins in the transition or compression zone, as shown in FIG. 1, and is always positioned half way between two adjacent flights of the primary conveying screw 6 so that it is also of constant pitch equal to that of the conveying screw. The diameter of this shearing screw 7 is always less than that of the primary conveying screw 6, i.e. so that the radial clearance between the inner wall of the barrel 2 and the shearing screw 7 is at least twice the radial clearance of the conveying screw 6.

FIGS. 2 and 3 illustrate more clearly these differences in the diameters of the two screws or thread flights as well as the specific differences in the depth of thread in the worm passage or channel or sections thereof as formed by the screws.

For purposes of definition herein, the letter "L" represents a measurement along the length of the extrusion screw, while the letter "D" represents the diameter of the primary conveying screw 6, a diameter which is quite close to the internal diameter of the barrel 2 since it differs therefrom only by the amount of radial clearance designated by the letter "$s$". The radial clearance $s'$ of the shearing screw 7 is at least equal to and preferably greater than twice the radial clearance of the primary conveying screw 6, i.e., $s'$ is equal to or greater than $2s$. The radial clearance "$s$" is usually maintained in a range of about 0.001 to 0.01 times the screw diameter, preferably about 0.0075 to 0.002 times the screw diameter. It is conventional to maintain the radial clearance as small as possible consistent with machining tolerances and the workability or melt viscosity of the thermoplastic material, preferably so as to avoid any back flow of the material over the conveying thread flights 6. Some leakage or back flow cannot be prevented, but it has been thought that a minimal back flow would produce a maximum heat transfer in the worm passage. For reasons discussed below, this repression of back flow is somewhat opposed to the present invention, particularly with reference to the effect of the shearing screw 7.

In the transition and/or metering section of the extruder, the primary conveying screw 6 defines a continuous helical channel or worm passage 8 having a width corresponding to the pitch of the thread flight 6. This conveying passage 8 is then divided into two equal sections, including a front section 8a and a back section 8b, by the continuous shearing screw 7. Moreover, in accordance with the invention, the thread depth on each side of the shearing screw 7 varies continuously and oppositely along the length of the worm passage. As seen in each of the Figures of the drawing, the area of the back chamber or portion 8b of the worm passage preferably decreases from a maximum to a minimum value over the length of the screw while the area of the front chamber or portion 8a correspondingly and proportionately increases from a minimum to a maximum value. Of course, in the transition section of the extruder, there is a gradual reduction in thread depth of both of the chambers 8a and 8b so that the material being transported is placed under a greater and greater pressure. This effect is clearly shown in FIG. 1, all of the remaining embodiments in the drawings being taken from the metering section to avoid such an additional illustration of the compression caused by a gradually increasing diameter of the screw core shaft.

It should be noted that the entire cross-section of the worm passage 8 remains constant at any point along the length of this passage or channel, i.e., such that the thread depth on either side of the shearing screw 6 is oppositely altered and the individual chamber or portion 8a or 8b is likewise oppositely altered so as to always give a constant cross-section of the entire passage 8. In other words, the thread depth of channel 8a plus the thread depth of channel 8b in the metering section is always equal to a constant. This relationship holds as long as there is no variation in the total pressure placed upon the transported material, it also being preferable to maintain a substantially constant volume or rate of flow through the metering section. The same principle generally applies in the transition section but with a constantly decreasing cross-section of the entire worm passage 8 so as to increase the pressure along the length of the extruder.

Each of the individual screws 6 and 7 is preferably defined by an outer peripheral flight land 6' and 7', respectively, falling in a cylindrical surface generated concentrically or parallel to the inner wall of the barrel 2. It is especially desirable for the shearing screw 7 to have a wider flight land 7' than that of the conveying screw. In general, the exact shape and configuration of the flight land 6' of the conveying screw can be quite conventional and adapted to normal practices in the construction of screw extruders. The width of the shearing screw land 7', on the other hand, should be sufficiently large to exert a substantial shearing stress on the thermoplastic material. When working with relatively low viscosity melts, this width of the land 7' can be quite large, and then correspondingly reduced with increasing melt viscosity. In general, it is preferable to employ a flight land 7' which is about 10 to 20 percent of the entire width of the worm passage 8 (the width of the worm passage being defined as the pitch of the conveying screw 6 less the width of the flight land 6').

By means of this arrangement of the shearing screw 7 and its flight land 7', in combination with the opposite variation of the thread depth or core shaft diameter on either side of the shearing screw 7, there is provided in the transition and/or metering section of the extruder a worm passage 8 which is subdivided into portions which vary in their cross-section over the entire length of the extruder, preferably one or more times. In each subdivision or channel 8a and 8b, the thread depth thus increases or decreases constantly in the direction of the worm passage length and this is accomplished over a predetermined length of the individual treatment zone or zones. A number of different embodiments are possible with reference to this variation in thread depth as explained more fully hereinafter.

In FIGS. 1-3, the thread depth of individual channel or subdivision 8b steadily decreases over the length illustrated. This means that the cross-sectional area or volume of flow through this back channel is constantly being decreased in the helical direction of the worm passage. Over the given length of the extruder, the thermoplastic material must therefore flow from the back channel 8b across the land 7' of the shearing screw 7 and into the constantly increasing cross-section of the channel or subdivision 8a. As shown in FIG. 2, one such alternation in thread depth or cross-section as between 8b and 8a occurs over a length of the extruder which is equal to 5 times the diameter of the conveying screw. In FIG. 3, one such alternation or variation from maximum to minimum of thread depth between the two channels 8b and 8a occurs over a length of 11 times the diameter of the conveying screw.

In all of these first embodiments, there has been illustrated a single variation over a given length of the extruder whereby the thermoplastic material, usually as a hot melt, is not only conveyed in the usual manner imposed by the helical or worm passage of the conveying screw 6, but also in a partly axial direction over the intermediate land 7' of the shearing screw from the back channel 8b to the front channel 8a. Thus, the thermoplastic material is caused to flow in both circumferential and axial directions, the intermediate flight land 7' causing a substantially increased shearing effect with a correspondingly greater mixing effect and a better temperature distribution.

After one such alternation or variation of the thread depth on either side of the intermediate flight land 7', this variation can then occur several times over the length of the extruder, i.e., so that the thread depth in each chamber 8b and 8a alternately increases and decreases in opposing manner as described above. For example, after the first variation as described above, the thread depth or cross-section of the back chamber 8b constantly decreases to a minimum value while the thread depth or cross-section of the front chamber 8a increases proportionately so as to achieve the same total cross-section of the worm passage 8. With highly fluid thermoplastic melts, this cyclic variation of thread depth in each adjacent chamber can be repeated many times, so that the melt alternately passes back and forth across the shearing land 7' many times over the length of the extruder. In most instances, however, and especially with more viscous thermoplastic melts, it has been found to be especially advantageous to maintain the flow of the thermoplastic melt forwardly across the shearing land 7' as much as possible. This embodiment is further described in conjunction with FIGS. 4 and 5.

In general, a continuous unidirectional flow of the thermoplastic material over the flight land of the intermediate shearing screw, e.g., from the back to the front portions of the worm passage over the entire length of the extruder, is accomplished by changing the structure of the screw at each alternation of thread depth variation, particularly by reducing the conveying screw in diameter to become the shearing screw while simultaneously increasing the diameter of the shearing screw to become the conveying screw. This exchange or reversal in the function of the two screws or thread flights is of course essential to maintain either a forward flow or a backward flow of the thermoplastic material over the shearing screw of smaller diameter. In using this particular measure, whether the melt flows over the shearing land in a forward or a backward direction, an additional effect is achieved because the separation of the fronts or fresh edges of the laminar melt flow is displaced by about 90° with reference to the build-up of these flow fronts. As a result, a subdividing of the laminar melt stream into ever finer melt layers take place over the entire length of the extruder.

As shown in FIG. 4, the required reversal of the conveying and shearing screws is accomplished for each variation of thread depth occuring over a length of 4.5 times the diameter of the conveying screw. The illustrated section of the extruder barrel 9 is in the discharge or metering zone having a substantially constant volumetric flow of the thermoplastic material. The worm passage or total channel 10 is in this instance essentially defined by the normal pitch of the conveying screw, i.e., where there is only one intermediate flight land between two adjacent flights of the conveying screw having only a slight radial clearance.

Beginning at the right-hand end of the screw core shaft 11 of FIG. 4, a terminal portion of a conveying screw 12 is illustrated as it is gradually converted or changed into a shearing screw, this change beginning with the flight 13 and being completed at flight 14. At the same time, the initial shearing screw or flight 15 is gradually changed into a conveying screw as its diameter increases beginning with flight 16 and is then completed in flight 17.

In the illustrated length of 4.5 D as shown in FIG. 4, the thread depth on both sides of the shearing screw as represented by flight 14 continuously and oppositely increases and decreases, i.e., so that the back portion of the worm passage becomes gradually larger as the front portion becomes gradually smaller. Therefore, if the general direction of melt conveyance by the larger conveying flights is that indicated by the arrow at the right end of the screw core shaft 11, the melt is being forced backwardly over the intermediate shearing flight lands, and this backward shearing flow is repeated by interchanging the conveying and shearing screws at each point of maximum or minimum thread depth over the length of the extruder. Thus, where the preceding front chamber 18 has reached a minimum depth during the change-over in screw function, the back chamber 19 separated therefrom by the thread flight 15 has likewise reached a maximum depth. These front and back chambers then also change their relative positions over the next few flights of both screws, i.e., in one case the thread depth increases steadily in the direction of the worm passage length while in the other case the thread depth correspondingly decreases steadily. In other words, there is a positionally offset passage cross-section from each individual passage chamber to passage chamber as the diameters of the two different flights of screws are continuously interchanged or reversed in size.

This change-over in function can also be seen from the fact that the front chamber 18 has become a back chamber at 20, while at the same time the back chamber 19 is gradually changed into a front chamber as it passes along the changing flights from chamber 21 to chamber 22.

Accordingly, instead of providing an alternating increase and decrease in cross-section of the individual front or back chambers or the worm passage, the embodiment shown in FIGS. 4 and 5 essentially permits an alternation between the conveying screw or flight 12 with the shearing screw or flight 15 at the point of alternation which occurs at approximately 18. The next point at which this change takes place corresponds approximately to the chamber 23.

The required structural changes for this particular embodiment can be viewed somewhat schematically in FIG. 5 in which the change or reversal of the two screws or flight lands occurs generally at point 18 as indicated in FIG. 4. Thus, it will again be noted that the flight 15 which began as a shearing screw is transformed into a conveying screw as its diameter increases outwardly to a small radial clearance with the barrel 9. Conversely, the original conveying screw 13 is correspondingly reduced in diameter to become a shearing screw 14, and the two thread flights have completely interchanged their functions to permit a continuous flow of the thermoplastic melt in one direction over the shearing screw. Also, it should again be noted that the melt flow direction over the shearing screw 15 as well as the shearing screw 14 after the change-over in function of the thread flights is always opposite to the normal conveying direction through the extruder. It is especially preferred, however, to provide this change-over or reversal of the thread flights with the embodiment shown in FIG. 2, i.e., such that the indicated length of 5D has the same configuration or change of thread depth repeated several times over the length of the extruder, the melt then always flowing forwardly over the intermediate shearing screw or flight land 7'. In both cases, an extremely good mixing and shearing effect is achieved, and with the embodiment of FIG. 2 as modified by interchanging the functions of the screws, one achieves an especially smooth and uniform conveyance of the thermoplastic melt as well as a good metering or discharge into the extrusion die 5.

Regardless of the particular embodiment, the variation in thread depth and/or the reversal in function of thread flights can be chosen in such a manner that a single or multiple overflowing, forwardly and/or backwardly, takes place over the intermediate shearing flight land. For example, if there is at least a double alternation of the variation in thread depth or the size of the individual sub-sections of the worm passage, the thermoplastic melt can flow once in a forward direction and once in a backward direction over the shearing flight land, or with the interchange of the thread flights, the melt can be caused to flow always in one direction either forwardly or backwardly over the shearing land. For example, if the worm passage is subdivided in such a way that the back chamber begins with a maximum thread depth, i.e., the largest cross-sectional area, toward the drive side of the screw, then the melt should flow at least once over the shearing land in the extrusion direction.

In all of the embodiments of the screw according to the invention, the individual particles and components of the thermoplastic melt are exposed to a relatively great shearing force as the thermoplastic material is compelled to flow over the shearing land and between the additional gap created between this intermediate shearing screw and the barrel wall. This shearing of the thermoplastic particles and melt in the relatively narrow gap is further associated with a relayering of the initially formed layers of melt being conveyed along the worm passage, and this special shearing effect is also associated with a better heat transfer across the gap and above the shearing land, thereby more favorably intermixing and homogenizing all of the constituents of the melt.

Depending upon the frequency at which the melt alternates from one portion or sub-chamber of the worm passage to the other, as caused by the continuous variation in the rise and decline of the thread depth, one can achieve a very large number of layers undergoing the shearing effect over the shearing flight land.

The length of the zone or section of the extruder in which the variation in thread depth takes place is normally determined with reference to the known viscosity of the thermoplastic melt. For example, with a relatively low melt viscosity, this variation in thread depth alternates or reverses at or over a screw length of not less than about one-half the diameter of the conveying screw. Thus, low melt viscosities permit a frequent alternation over a length of approximately ½ D as a minimum length. In the case of relatively high melt viscosities, it is advantageous to provide an alternation of thread depth at a screw length of not less than about 10 times the diameter of the conveying screw, i.e., $L \geqq 10 D$.

The additional interchange of the conveying and shearing thread flights does tend to expose the thermoplastic melt to a much more intensive intermixing, especially at those points at which the interchange occurs. In the direction of the worm passage length, the interchange of the different thread flights in one sense causes a half worm passage to be missing, but this in turn helps to create a relayering and more thorough shearing or mixing effect on the thermoplastic material.

In general, the pitch or lead of the conveying screw is chosen in a conventional manner so as to positively handle the conveyance of a thermoplastic material having a certain melt viscosity. Thus, a relatively short pitch is often sufficient with materials of low viscosity while a longer pitch is required with a relatively high viscosity melt. It is especially preferred to maintain a constant pitch, not only for the conveying screw but also for the shearing screw as well as maintaining a constant diameter for each of these screws. The only exception to this rule is generally where one accomplishes an interchange in the particular function as between the conveying and shearing thread flights.

Although it has been previously proposed to employ more than one thread flight in a screw extruder, the present invention is distinguished not only be a precise difference in function between the two thread flights but is also distinguished by the variation in thread depth and/or interchange of thread flights. It was quite surprising to find that the essential shearing functions of the extruder screw of the invention could be accomplished through one or both of the transition and metering sections of the screw without in any way interfering with a uniform conveyance and proper metering of the thermoplastic melt.

As shown in FIG. 6a and FIG. 6b, additional mixing or shearing means can also be provided in order to further homogenize the melt and improve the temperature distribution. These additional shearing means are preferably included in the metering section as generally indicated in FIG. 1, for example in the form of transverse recesses or slots 24 and 25 at predetermined positions in the flight lands 6' and 7' of the conveying and shearing screws, respectively. Such interruptions around the circumference of the individual flight lands in the form of slots or the like are particularly advantageous in producing an additional mixing or layering of the thermoplastic melt as it is passed from one chamber or sub-section of the worm passage to the other. Such slots can be arranged parallel to the axis of rotation or may be at an angle transversely of the flight land. Shapes other than those illustrated may also be employed.

As shown in FIG. 6b, a similar additional mixing effect can be achieved by means of radially projecting pins or rods 26 which are firmly inserted or mounted on the helical base of the worm passage between the adjacent screws or flight lands 6' and 7'. Again, the thermoplastic melt is caused to flow around these projecting pins to produce an additional mixing and homogenizing of the melt, particularly within the deeper portions of the worm passage.

Finally, as shown in FIG. 6c, it is possible and often very advantageous to provide a delaying or retention zone at the discharge or exit end of the screw extruder, i.e., just before the discharge channel at 4 connecting the extrusion die 5 as indicated in FIG. 1. In order to achieve this result, the worm passage is substantially enlarged by reducing the diameter of the screw core shaft 1 sharply over a conical section 27 to the final segment 28. Since the conveying screw is continued on this segment 28, there is a much larger worm passage in which the melt can be temporarily delayed before it is extruded. With a longer retention time of the melt per unit length of screw along this particular segment 28 of the screw core shaft, there is a variation in the melt layers previously transported at a faster rate, and one can further promote the homogenizing process.

Other known variations in extrusion screws can also be readily adapted to the specific construction required by the present invention, for example by providing a torpedo-shaped shaft or even adding other mixing and homogenizing apparatus between the screw discharge and the extrusion die. These and similar alterations in the construction and arrangement of the screw extruder and its associated elements can be made without departing from the essential features of this invention.

In general, the abbreviations employed herein were originally selected in the German language to correspond to the designations used by G. Schenkel in his book "Schneckenpressen fur Kunststoffe", Carl Hanser Verlag, Munich (1959). Any variations from this source due to translation or alternative selections should be apparent to those skilled in this art and generally conform to accepted usage in the English language.

The invention is hereby claimed as follows:

1. In a screw extruder for continuously processing a thermoplastic material wherein screw means are provided to convey said thermoplastic material consecutively through a feed section, a transition section and a metering section along said screw which is revolved within an elongated extruder barrel housing while melting and mixing the conveyed material, the improvement which comprises:

an elongated screw core shaft housed in at least one of said transition and metering sections, said screw core shaft bearing a primary conveying screw in which the thread flight extends radially outwardly to provide a small clearance s between its outer peripheral edge and the interior cylindrical wall of the barrel housing, thereby defining a continuous helical worm passage, said screw core shaft further bearing a secondary shearing screw in which the thread flight extends continuously in a helical path centrally of the worm passage defined by the conveying screw and radially outwardly to a peripheral flight land which is approximately parallel to and spaced inwardly at a distance of at least about .2s from the interior cylindrical wall of the barrel housing, the depth of thread on each side of the shearing screw being continuously and oppositely altered in the direction of worm passage length.

2. A screw extruder as claimed in claim 1 wherein the depth of thread varies oppositely on each side of the shearing screw and alternately increases and decreases between a minimum and maximum value over the length of the screw.

3. A screw extruder as claimed in claim 2 wherein said alternation of thread depth occurs at a screw length of not less than about one-half the diameter of the conveying screw for thermoplastic melts of relatively low viscosity.

4. A screw extruder as claimed in claim 2 wherein said alternation of thread depth occurs at a screw length of not less than about ten times the diameter of the conveying screw for thermoplastic melts of relatively high viscosity.

5. A screw extruder as claimed in claim 2 wherein at each alternation of thread depth over the length of the screw, the conveying screw is reduced in diameter to become the shearing screw while the shearing screw is simultaneously increased in diameter to become the conveying screw.

6. A screw extruder as claimed in claim 1 wherein that portion of the worm passage behind the shearing screw, with reference to the conveying direction, is continuously varied from a maximum to a minimum thread depth while that portion of the worm passage in front of the shearing screw is continuously varied from a minimum to a maximum thread depth, the total cross-sectional area of the worm passage remaining constant such that thermoplastic material is continuously passed over said shearing screw from the back to the front portion of the worm passage.

7. A screw extruder as claimed in claim 6 wherein the variation between maximum and minimum thread depth in each portion of the worm passage is repeated alternately over the length of the screw.

8. A screw extruder as claimed as claim 7 wherein at each alternate repetition of thread depth variation, the conveying screw is converted into the shearing screw while the shearing screw is simultaneously converted into the conveying screw such that thermoplastic material flows substantially only from the back to the front portion of the worm passage over the entire length of the screw.

9. A screw extruder as claimed in claim 1 wherein the width of the flight land of the shearing screw is larger than the flight land of the conveying screw.

10. A screw extruder as claimed in claim 1 wherein said screw core shaft contains a plurality of radially projecting pins on the helical base of the worm passage between adjacent screws in at least one of said transition and metering sections.

11. A screw extruder as claimed in claim 1 wherein the flight lands of at least one of said conveying screw and said shearing screw are transversely slotted at predetermined positions to vary the flow of thermoplastic material between adjacent worm passages or subdivisions thereof.

12. A screw extruder as claimed in claim 1 wherein said worm passage is enlarged at the discharge end of said screw to provide a substantially longer retention time per unit length of screw as compared to the preceding processing sections.

* * * * *